United States Patent [19]

Lumpkins

[11] Patent Number: 4,521,197
[45] Date of Patent: Jun. 4, 1985

[54] MONEY CALCULATION GAME

[76] Inventor: Rebecca G. Lumpkins, 817 S. 18th Ave., Maywood, Ill. 60153

[21] Appl. No.: 603,191

[22] Filed: Apr. 24, 1984

[51] Int. Cl.³ .......................... G09B 19/02; A63F 9/04
[52] U.S. Cl. .................................... 434/110; 434/208; 273/146
[58] Field of Search ............... 434/110, 191, 208, 209; 273/145 R, 145 A, 146, 256, 278, 297

[56] References Cited

U.S. PATENT DOCUMENTS

| | | | |
|---|---|---|---|
| 431,102 | 7/1890 | Anderson | 434/208 |
| 1,242,002 | 10/1917 | Lewis | 273/256 |
| 1,561,592 | 11/1925 | Bott, Jr. | 273/146 |
| 1,562,866 | 11/1925 | Burgess | 273/146 |
| 1,769,726 | 7/1930 | Walker | 273/146 |
| 3,204,345 | 9/1965 | Buckner | 434/208 |
| 3,314,168 | 4/1967 | Heckman | 434/208 |
| 3,523,377 | 8/1970 | Gardner | 434/209 X |
| 3,959,893 | 6/1976 | Sigg | 434/208 |
| 4,114,290 | 9/1978 | Cooper | 434/208 X |

FOREIGN PATENT DOCUMENTS

| | | | |
|---|---|---|---|
| 34867 | 3/1886 | Fed. Rep. of Germany | 273/146 |
| 637247 | 5/1950 | United Kingdom | 273/146 |

Primary Examiner—William H. Grieb
Attorney, Agent, or Firm—Richard G. Kinney

[57] ABSTRACT

A game apparatus for challenging the mental dexterity of two or more players and teaching children readily how to recognize, add and remember monetary sums is disclosed, which uses three cubical members, two main members, one of which has indicia on its faces corresponding primarily to common coins, e.g., 1¢, 5¢, 10¢, 25¢, 50¢, and $1; and the other of which has indicia on its faces corresponding to common monetary notes, e.g., $2, $5, $10, $20, $50 and $100; and a lead member which has indicia of instructions on its face, e.g., score, no score, and second chance. The members are housed in a box-like container with a transparent top and thrown by the players in sequential innings, with the individual player's score in each inning being determined by the upper face amount and the instruction. Each player accumulates his score from his innings and the first to reach a specific amount, such as one grand ($1,000), is declared the winner. A second embodiment is further disclosed wherein pictures of the coins or portions of the notes are used as indicia and the lead member has symbols for loss, as well as score, no score, and second chance.

14 Claims, 8 Drawing Figures

MONEY CALCULATION GAME

BACKGROUND OF THE INVENTION

1. Field of the Invention

This invention relates to instructional and amusement game apparatus and, more particularly, to a unique game for aiding children and others to recognize, add, and remember monetary sums.

2. Description of the Prior Art

Games for aiding children and others in learning addition and other arithmetic operations have been suggested for some time. One of the earliest of such games is shown in German Pat. No. 34,867 issued in 1886 to A. Sala. Others of this type are described in U.S. Pat. No. 3,523,377 issued on Aug. 11, 1970 to John R. Gardner and entitled INSTRUCTIONAL GAMING APPARATUS; Pat. No. 3,959,893 issued on June 1, 1976 to T. W. Sigg entitled EDUCATIONAL GAMING APPARATUS; Pat. No. 3,314,168 issued on Mar. 18, 1967 to M. J. Heckman entitled MATHEMATICAL INSTRUCTION MEANS; and Pat. No. 4,114,290 issued on Sept. 19, 1978 to J. B. Cooper entitled ARITHMETIC DICE GAME. Such games use one or more instructional dice or block member, e.g., having addition, subtraction, division, etc. symbols, and two or more numbered block members having number symbols and serve to teach and drill children and others in performing general arithmetic operations.

Similarly, apparatus have been employed to play games based upon sporting games, such as baseball, in U.S. Pat. No. 1,769,726 issued on July 1, 1930 to R. Walker and entitled GAME; or football, in U.S. Pat. No. 1,562,866 issued on Nov. 24, 1925 to N. W. Burgess and entitled GAME APPARATUS. Such games are only incidentally educational, being primarily amusement devices. A similar amusement or gambling apparatus involving dice and a stack of chips is shown in British Pat. No. 637,247 issued to F. Best in May 17, 1950 and entitled IMPROVEMENTS IN OR RELATING TO GAMES OF CHANCE.

While generally amusing or generally instructional, such games do not add to the practical knowledge and skills needed by children, specifically in handling and dealing with money and specifically with dealing with common coinage and monetary note amounts.

SUMMARY OF THE INVENTION

In accordance with the present invention, a money addition game is provided with three block members: two main members which have symbols for monetary amounts on their faces and a lead member which has symbols indicating at least scoring and not scoring. Whereby two or more players may throw the members in successive innings and at least add together the monetary amounts indicated on the main members when score is indicated by the lead member.

The invention, together with the advantages thereof, may best be understood by reference to the following description taken in connection with the accompanying drawings, in the several figures of which, like reference numerals identify like elements.

DETAILED DESCRIPTION OF THE PREFERRED EMBODIMENTS

Figure 1:
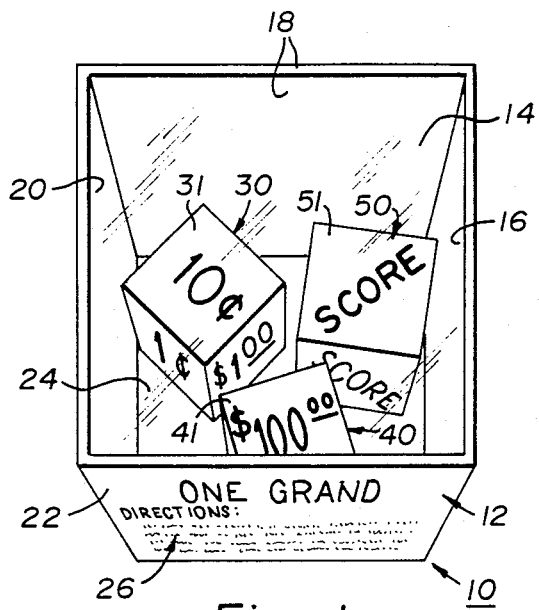
FIG. 1 is a perspective top view of a preferred embodiment of the present invention, namely, a container enclosing members constructed in accordance with the present invention.

Referring to FIG. 1, there is depicted a money recognition and computation game apparatus generally designated by the number 10. The game apparatus 10 includes a container 12 which is preferably, and as depicted, approximately cubical with a transparent top 14 and opaque side walls 16, 18, 20 and 22 and bottom 24 and sized to be easily handled by the players. One or more side walls, such as the wall 22, may bear the directions 26 for playing the game.

Inside the container 12 and easily viewable by the players through its transparent top 14 are three block members 30, 40 and 50, preferably as shown of a generally cubical shape. Two of these members, namely, members 30 and 40, are here termed main members and bear symbols or indicia of monetary amounts on them, such as the symbol for 10¢ shown on the upper face 31 of main member 30 or the symbol $100 on face 41 of main member 40. The third member 50 is the lead or instruction member and bears symbols or indicia indicating the operation to be performed by the player, such as "score" on face 51 of member 50.

Figure 2:
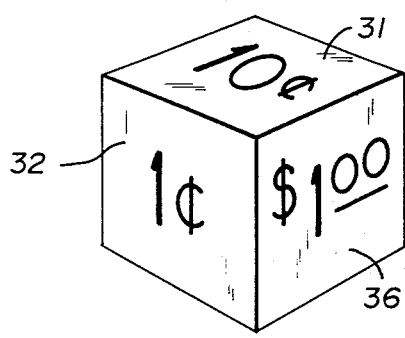
FIGS. 2, 3 & 4 are each a pair of perspective views showing all sides of a different one of the three members depicted in FIG. 1.
Figure 2:
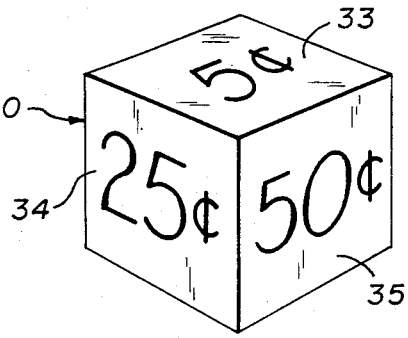

The main member 30 is shown in more detail in FIG. 2 wherefrom it can be appreciated that it bears symbols 1¢, 5¢, 10¢, 25¢, 50¢ and $1 on its faces 32, 33, 31, 34, 35 and 36. That is, it bears the symbols for the values of the common coins in use today in the United States, the penny, nickel, dime, quarter, half dollar and dollar.

Figure 3:
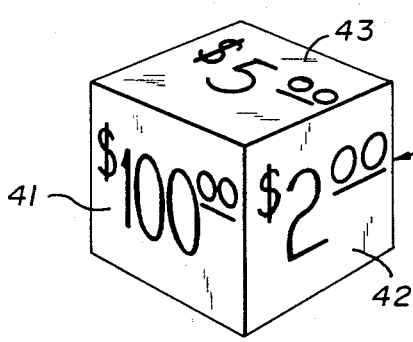
Figure 3:
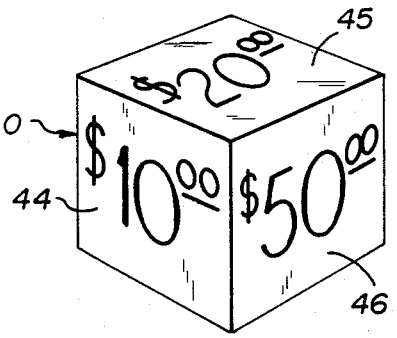

Referring to FIG. 3, there is depicted all six faces of the second main member 40, wherein the symbols $2, $5, $10, $20, $50, and $100 are on its faces 42, 43, 44, 45, 46 and 41. That is, all of the common notes (with the exception of $1 which currently circulates as both a coin, as well as a note and is already present on the other main member 30) and thus need not be duplicated here) are on the faces.

Figure 4:
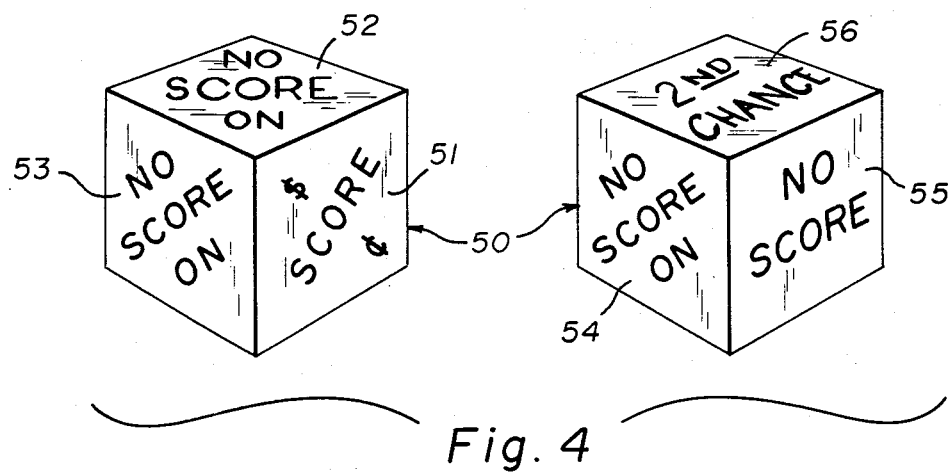

FIG. 4 depicts the six faces of the lead member 50 and as can be seen there, this member's faces bears "score" on face 51 and "no score" on faces 52, 53, 54 and 55, and "2nd chance" on the last face 56.

Figure 5:
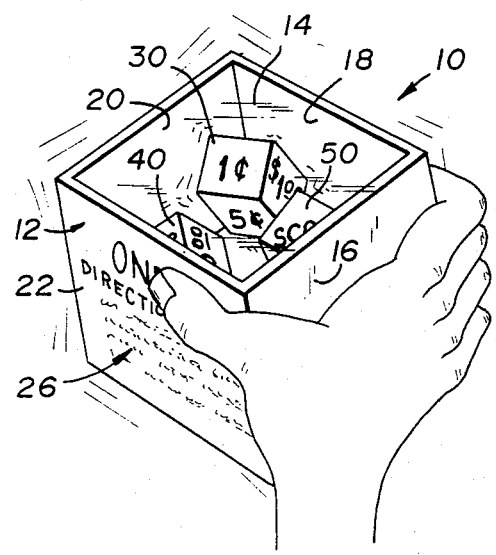
FIG. 5 is a perspective view of the container and members of FIGS. 1 through 4 illustrating it being thrown or shaken by a player's hand.

In use, the game is played by the player "throwing" the members 30, 40 and 50 by shaking the container 12 as shown in FIG. 5 to mix up the members and then tossing it on a flat surface or otherwise bringing it and members 30, 40 and 50 to rest on its bottom surface 24 as shown in FIG. 1. The player then follows the lead member 50, e.g., if a "score" adds the upper face amounts together ($100.10 in FIG. 1).

In more detail, a typical game may begin with its players choosing a starter by, e.g., throwing the members with the highest money amount displayed going first and proceeding clockwise. The player then mixes well the three members 30, 40 and 50 by, for example, shaking them as shown in FIG. 5, and brings them to rest so that they can be read (as in FIG. 1).

As an example, let us say that the two main members 30, 40 display $100 and $1 and the lead member 50 displays "score". The player adds the amounts to $101 and that is the score of that player for that inning. The apparatus 10 is then passed to the next player who similarly throws the members. As a further example, let us say that the results are also $100 and $1, but "no score" is displayed on the lead member 50. In this case, the player gets no score for that inning and passes the apparatus 10 to the next player. Let us suppose that this new player's throw again results in $100 and $1, being displayed by the main members, but has displayed "2nd chance" on the lead member. In this case, that player throws again, with the amount from the first throw being carried over and added to the amount of the second (or more if he or she again gets "2nd chance") and the adding to his score then being determined by the lead member 50 face display. If it is "score" and the main members again displayed $100 and $1 then the score for that round would be $202 ($101 from the first throw, plus $101 from the second throw). Of course, if the main cube displayed "no score", the player would gain nothing in that inning.

When the first player's turn comes up again (his second inning), his prior score ($101 in our example) is added to his next throw's score (if any). Let us say his second throw yields $50 and 50¢ and "score". He adds the two main members to get $50.50 and then adds that to his prior score ($101) to total $151.50 as his new total.

Play continues in this manner with each player's score from prior innings being totaled until the first player reaches and exceeds specific pre-specified amounts, such as "one grand" or $1,000, whereupon he or she is declared the winner.

Note should be made of the fact that all of the players are encouraged by their interest in winning the game, to check the arithmetic of the player making a throw, and to also keep in their memory all other player's running totals.

Figure 6:
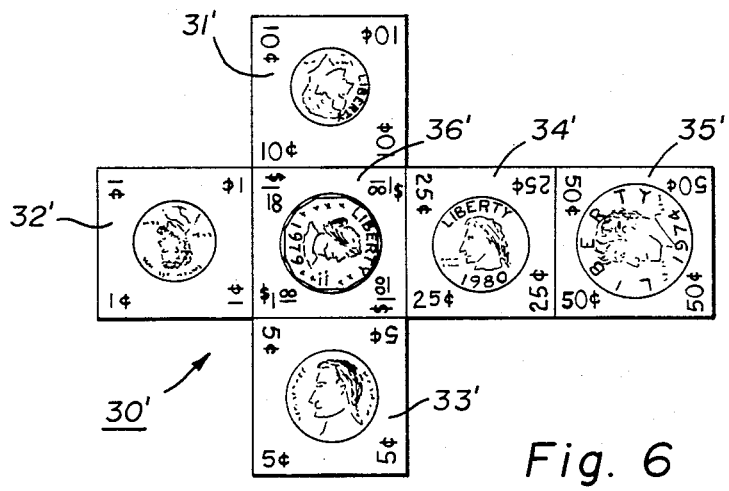
FIGS. 6, 7 & 8 are each layout views of one alternative construction for each of the three members of FIGS. 2, 3 and 4 illustrating an alternative embodiment of the invention.
Figure 7:
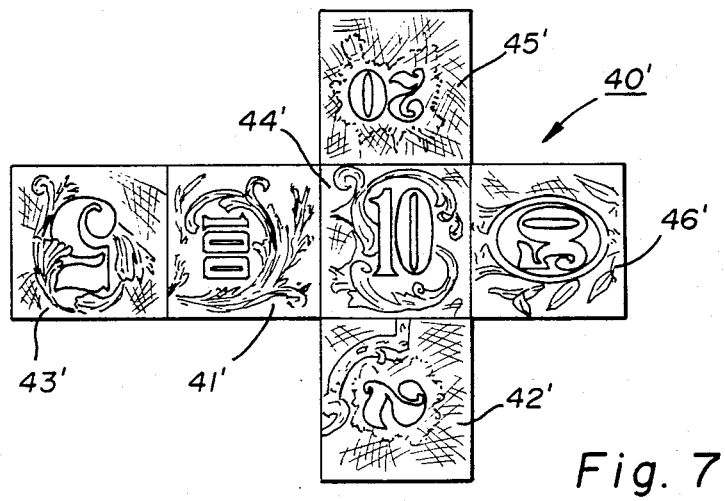
Figure 8:
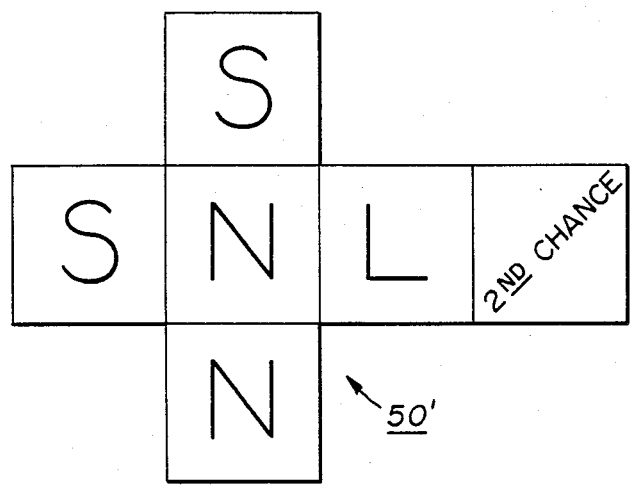

Referring now to FIGS. 6, 7 and 8, there is depicted an alternative embodiment for the members. In FIG. 6 is an alternative to the main member 30 which is labeled 30', wherein the symbols used for the coins on the faces 31' through 36', are pictures of the actual coins involved (as well as multiple indicia such as "1¢", "10", etc. at the corners of the faces). This has the advantage of familiarizing the younger child with the appearance of the actual coin as well as its value and how it can be added into a score.

In FIG. 7, the symbols used for the main member 40' are pictures of the dollar amounts from the actual bills, again, to help familiarize the child who may not be otherwise exposed to such notes, with their appearance and value.

In FIG. 8, an alternative layout for the lead value 50 is shown which alternative cube 50' uses "S" and "N" to symbolize "score" and "no score" as well as a new symbol "L" which represents a loss (or subtraction from the player's score). Note that in this alternative main member 50', the ratio is two "N" to two "S" to one "L". Thus, on average, the players will gain score totals since scores will outnumber losses by two to one.

This alternative set of members can be used in a container such as the container 12 of FIG. 1 and FIG. 5 and will play in the same manner as described above, but with added mental exercise being gained by having to recognize coinage and notes, as well as to subtract monetary amounts, in addition to adding monetary amounts.

While the invention can be made in many sizes and arrangments, a prototype of the members 30, 40 and 50 was constructed of solid wood with sides of 1 inch square, and that size proved effective. The container 12 is then preferably sized to be about 3½ inches on each edge. This size is easily handled and passed by the players, even the youngest. Of course, these examples are only stated to give specificity to this disclosure and not in the way of any limitation. While it is the currently contemplated best mode of practicing this invention, it may well be that, based upon further experiments and development work or as dictated or indicated by economies of production, the present inventor may herself decide to change the dimensions, materials and form of future commercial embodiments of this invention and it is the intention to cover all such in the broader claims.

It should now be apparent that a novel and instructional game apparatus has been disclosed that aids in recognizing and dealing with coinage and note amounts. In this specification and in the claims we will refer to such coinage and note amounts as common currency denominations. While disclosed in only two embodiments, the invention can be adopted to many forms and alternatives. As another example, the values could be symbolized by depicting only the coins in the coin member and a symbol for the more common one dollar bill could be used in place of the coin on that member. Instead of depicting the note amounts, the picture of a founding father on that note may be used with or without symbols of the corresponding value to teach and familiarize the player with the fact that, e.g., President Lincoln is on the five dollar bill and Benjamin Franklin on the one hundred dollar bill.

The game may also be easily extended to and adapted to other currency systems, in which case the symbols used would be related to the coinage and notes of the particular country. Thus, the invention could be employed to help familiarize adults as well as children with the currency and coinage of a foreign country that they may be about to visit, and by making such learning fun, to make it easier.

While the game is of great value to children and adults in learning, it is also ideal for adults to play as a game of chance, as it is a most entertaining game of chance for adults of all ages.

While two particular embodiments of the invention have been shown and described, it will be obvious to those skilled in the art that changes and modifications may be made without departing from the invention and, therefore, the aim in the appended claims is to cover all such changes and modifications as fall within the true spirit and scope of the invention.

What is claimed is:

1. A money recognition and computation game for play by two or more players, comprising three block members, each having a plurality of faces; two of said block members being main members which have monetary amounts on their faces, said amounts corresponding to common currency denominations and the other being a lead member which has symbols indicating scoring or no scoring on at least some of its faces, whereby these members, when caused to be thrown by the players in successive turns or innings and then comes to rest with said member's upward faces determined in a random manner, the players may add or not add the resulting monetary amount shown by the upper faces of the two main members to the score of the throwing player, depending upon whether a symbol indicating scoring or no scoring is present on the upper face of said lead member.

2. The money game of claim 1 wherein said lead member includes at least one face with a symbol indicating that the player's inning continues with a second throw, whereby if that face lands uppermost after a throw, the throwing player continues with another throw and the scoring of his first and successive throws with that second throw symbol uppermost are accumulated and added or not added to his score depending upon the presence or absence of a scoring or no scoring symbol on said lead main member at the last throw of that inning.

3. The money game of claim 1 wherein the first of said two main members bears symbols for different monetary amounts on its different faces, such amounts being the whole common monetary note units, such as $5, $10, $20, $50, and the other of said main member bears symbols for different monetary amounts in its faces, such amounts being in coin units, such as 1¢, 5¢, 10¢, 25¢, and 50¢.

4. The money addition game of claim 2 wherein said members are generally cubical in shape and said lead member bears symbols indicating no score on four of its six faces with a symbol indicating score on one of its two other faces and a symbol indicating second chance on its last face.

5. The money game of claim 4 wherein the first of said two main members bears symbols for different monetary amounts on its different faces, such amounts being the whole common monetary note units, such as $5, $10, $20, $50, and the other of said main member bears symbols for different monetary amounts in its faces, such amounts being in coin units, such as 1¢, 5¢, 10¢, 25¢, and 50¢.

6. The money game of claim 5 wherein the game continues with players taking successive turns or innings until one player's score adds up to a specific monetary amount, who is then declared to be the winner.

7. A money computation game, comprising three block members, each having a plurality of faces; two of said block members being main members which have monetary amounts on the faces said amounts corresponding to common currency denominations, and the other being a lead member which has symbols indicating scoring or no scoring on at least some of its faces, whereby these members, when caused to be thrown by the players in successive turns or innings and then comes to rest with said member's upward faces determined in a random manner, the players may add or not add the resulting monetary amount shown by the upper faces of the two main members to the score of the throwing player, depending upon whether a symbol indicating scoring or no scoring is present on the upper face of said lead member; and a container sized to easily contain said three members so that they may be caused to be moved randomly and thrown by shaking the container.

8. The money game of claim 7 wherein said container includes the three members in its interior and has a transparent wall through which the players may view the thrown members after a player throws them.

9. The money game of claim 8 wherein said lead member includes at least one face with a symbol indicating that the player's inning continues with a second throw, whereby if that face lands uppermost after a throw, the throwing player continues with another throw and the scoring of his first and successinve throws with that second throw symbol uppermost are accumulated and added or not added to his score depending upon the presence or absence of a scoring or no scoring symbol on said lead main member at the last throw of that inning.

10. The money addition game of claim 9 wherein said members are generally cubical in shape and said lead member bears symbols indicating no score on four of its six faces with a symbol indicating score on one of its two other faces and a symbol indicating second chance on its last face.

11. The money game of claim 10 where the first of said two main members bears symbols for different monetary amounts on its different faces, such amounts being the whole common monetary note units, such as $5, $10, $20, $50, and the other of said main member bears symbols for different monetary amounts in its faces, such amounts being in coin units, such as 1¢, 5¢, 10¢, 25¢, and 50¢.

12. The money game of claim 11 wherein the game continues with players taking successive turns or innings until one player's score adds up to a specific monetary amount, who is then declared to be the winner.

13. The money game of claim 12 wherein said members are about 1 inch on each edge and said container is a square box of about 3½ inches on each edge.

14. The money game of claim 12 wherein the specific amount is one grand.

* * * * *